US011371639B2

(12) United States Patent
Kesler et al.

(10) Patent No.: US 11,371,639 B2
(45) Date of Patent: Jun. 28, 2022

(54) SEAL CONFIGURATION TO PREVENT DAMAGE FROM EXPLOSIVE DECOMPRESSION

(71) Applicant: Hanon Systems, Daejeon (KR)

(72) Inventors: Eric Kesler, Northville, MI (US); Michael Sproule, Milford, MI (US)

(73) Assignee: HANON SYSTEMS, Daejeon (KR)

(*) Notice: Subject to any disclaimer, the term of this patent is extended or adjusted under 35 U.S.C. 154(b) by 412 days.

(21) Appl. No.: 16/519,168

(22) Filed: Jul. 23, 2019

(65) Prior Publication Data

US 2020/0049299 A1    Feb. 13, 2020

Related U.S. Application Data

(60) Provisional application No. 62/716,588, filed on Aug. 9, 2018.

(51) Int. Cl.
  *F16L 23/16*   (2006.01)
  *F16L 55/07*   (2006.01)
  *F16L 21/02*   (2006.01)
  *B60H 1/00*    (2006.01)

(52) U.S. Cl.
  CPC .......... *F16L 55/07* (2013.01); *B60H 1/00571* (2013.01); *F16L 21/02* (2013.01)

(58) Field of Classification Search
  CPC . F16L 23/18; F16L 23/16; F16L 21/03; F16L 21/02; F16L 21/022; F16L 21/04; F16J 15/022; F16J 15/104; F16J 15/024

USPC ................................. 285/374, 124.3, 124.4
See application file for complete search history.

(56) References Cited

U.S. PATENT DOCUMENTS

| 5,722,667 A * | 3/1998 | Lim .................. F16J 15/062 277/362 |
| 6,318,768 B1 | 11/2001 | Gehres |
| 2006/0175829 A1 | 8/2006 | Kaimer et al. |
| 2010/0052268 A1 | 3/2010 | Schroeder et al. |
| 2010/0225110 A1 | 9/2010 | Christie et al. |

FOREIGN PATENT DOCUMENTS

| DE | 102013006083 A1 | 10/2014 |
| EP | 1843072 B1 | 2/2010 |
| JP | H0931671 A | 2/1997 |
| JP | 2001015392 A | 1/2001 |
| JP | 2003156002 A | 5/2003 |
| JP | 2008256091 A | 10/2008 |
| JP | 2010014183 A | 1/2010 |
| JP | 2011137550 A | 7/2011 |
| JP | 5194002 B2 | 5/2013 |
| KR | 20070083603 A | 8/2007 |

* cited by examiner

*Primary Examiner* — Aaron M Dunwoody
(74) *Attorney, Agent, or Firm* — Shumaker, Loop & Kendrick, LLP; James D. Miller

(57) ABSTRACT

A seal assembly for an air conditioning system includes an annular inner seal member and an annular outer seal member coupled to the inner seal member. The outer seal member has a first recess formed in a first surface thereof. The first recess transitions between a substantially closed configuration when the outer seal member is compressed and a substantially open configuration when the outer seal member is decompressed.

19 Claims, 5 Drawing Sheets

SEAL CONFIGURATION TO PREVENT DAMAGE FROM EXPLOSIVE DECOMPRESSION

CROSS REFERENCE TO RELATED APPLICATIONS

This application claims the benefit of U.S. Provisional Application No. 62/716,588, filed on Aug. 9, 2018. The entire disclosure of the above application is hereby incorporated herein by reference.

FIELD OF THE INVENTION

The invention relates to a fitting for a vehicle air conditioning system and more particularly to seal permitting high pressure gas to escape therethrough during decompression of the air conditioning system.

BACKGROUND OF THE INVENTION

Automotive refrigerant components used in air conditioning systems such as air conditioning systems employing refrigerants such as R744 ($CO_2$) refrigerant must undergo required testing as mandated by governmental agencies such as the United States and the European Union. Since decompression can occur in air conditioning systems by switching the air conditioning systems on and off (i.e. pressure rise and pressure drop), testing is required. For example, automotive refrigerant components in direct or indirect contact with R744 refrigerant must be tested according to German Association of the Automotive Industry (Verband der Automobilindustrie; hereinafter "VDA") German Institute for Standardization (Deutsches Institut für Normung: hereinafter "DIN") Specification, VDA DIN SPEC, 74102:2015-08. Under VDA DIN SPEC 74102:2015-08, if an elastomer of the connection technology is in direct or indirect contact with R744 refrigerant a decompression test shall be performed. Simulations of actual driving operations and idling operations of the air conditioning system at high ambient temperatures are especially critical when testing. Elastomers have a tendency to fail due to highly compressed R744 refrigerant trying to escape through the elastomer when pressure is rapidly released.

In certain air conditioning systems, metal seal fittings or gaskets are employed between fittings to maintain a seal between the fittings. However, typically a redundant elastomeric seal is also employed with the metal seal fitting. Therefore, the metal seal fittings are required to undergo the decompresion tests because of the elastomeric seal since the elastomeric seal will be predisposed to damage due to rapid pressurization with the R744 refrigerant and then rapid de-pressurization of the R744 refrigerant.

To militate against decompression damage to an elastomeric seal subjected to high presure, a connector with a gasket seal having a spring metal core coated with nitrile rubber (NBR) is typically employed. However, known seals with elastomeric seals do not typically permit gas to escape as quickly as may be required or desired, which results in damage to the seal.

Therefore, there is a desire for an elastomeric seal that minimizes damage caused to the elastomeric seals during decompression of the air conditioning system while maintaining required sealing function.

SUMMARY OF THE INVENTION

In accordance and attuned with the instant disclosure, an elastomeric seal that minimizes damage caused to the elastomeric seals during decompression of the air conditioning system while maintaining required sealing function, has surprisingly been discovered.

According to an embodiment of the disclosure, a seal assembly for an air conditioning system includes an annular inner seal member and an annular outer seal member coupled to the inner seal member. The outer seal member has a first recess formed in a first surface thereof. The first recess transitions between a substantially closed configuration when the outer seal member is compressed and a substantially open configuration when the outer seal member is decompressed.

According to another embodiment of the disclosure, a seal assembly for an air conditioning system is disclosed. The seal assembly includes an annular inner seal member and an annular outer seal member coupled to the inner seal member. The outer seal member has a plurality of first recesses formed in a first surface thereof and a plurality of second recesses formed in a second surface thereof. Each of the plurality of first recesses and the plurality of second recesses transitions between a closed configuration when the outer seal member is compressed and an open configuration when the outer seal member is decompressed.

According to yet another embodiment of the disclosure, a block fitting assembly is disclosed. The block fitting assembly includes a block fitting configured as one of a female block fitting and a male block fitting. The block fitting receives a tube conveying a refrigerant. A seal assembly engages the block fitting and including an annular elastomeric seal member having a plurality of recesses formed therein. The elastomeric seal has gases from the refrigerant embedded therein from a sorption process. The elastomeric seal releases the gases through the plurality of recesses.

DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
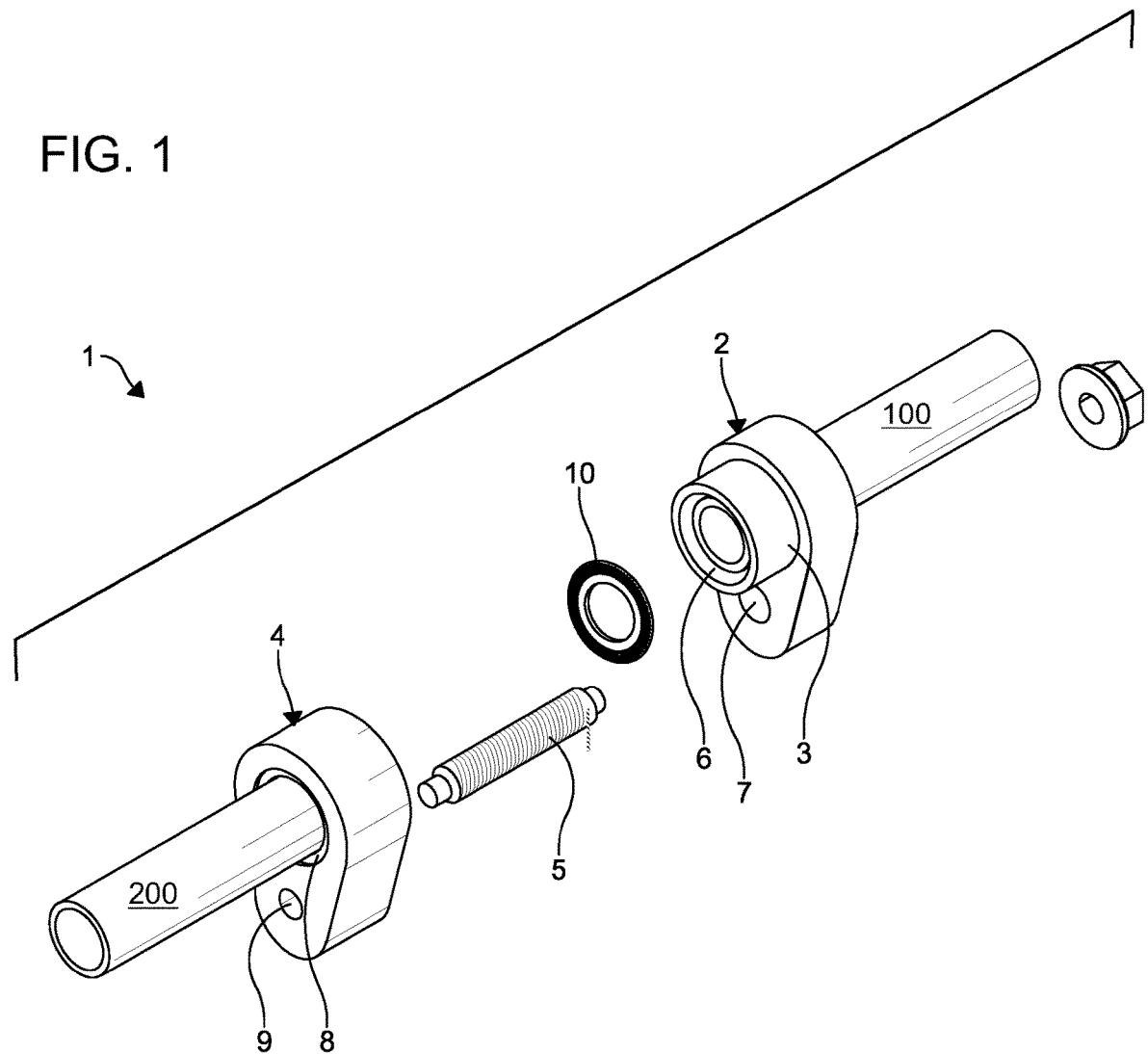
FIG. 1 is an exploded top perspective view of a block fitting assembly according to an embodiment of the instant disclosure.

FIG. 1 illustrates a block fitting assembly 1 according to an embodiment of the invention. The block fitting assembly 1 is configured for a refrigerant system of a vehicle such as a R744 refrigerant system of a vehicle. However, it is understood, the block fitting assembly 1 of the present disclosure can be configured for other systems such as oil and gas drilling systems, refrigerant systems other than vehicle refrigerant systems, or other fluid systems, as desired. The assembly 1 is configured to receive an end of a first tube 100 and an and of a second tube 200 therein to substantially axially align the tubes 100, 200. The assembly 1 includes a male block fitting 2 and a female block fitting 4. First apertures 6, 8 of the male block fitting 2 and the female block fitting 4, respectively, receive an end of one of the tubes 100, 200 respectively therein to substantially axially align the tubes 100, 200. A seal assembly 10 is received between the male block fitting 2 and the female block 4 fitting to substantially surround and seal the first apertures 6, 8 of the male block fitting 2 and the female block fitting 4. A female indentation (not shown) is formed in the female block fitting 4 to receive a male protuberance 3 formed on the male block fitting 2 to facilitate alignment of the respective first apertures 6, 8. Thus, a refrigerant is conveyed through the tubes 100, 200 in a substantially leak free manner. Second apertures 7, 9 formed in the male block fitting 2 and the female block fitting 4, respectively, receive a fastener 5 therein to facilitate fastening the male block fitting 2 and the female block fitting 4 together. It is understood features and shapes of the block fittings 2, 4 shown in FIG. 1 can vary depending on the application or the type of block fitting assembly employed. For example, the male block fitting 2 and/or the female block fitting 4 can include one or more holes for receiving aligning pins. In another example, each of the male block fitting 2 and the female block fitting 4 can have alternate cross-sectional shapes, different from the pear shape or obovate shape shown, such as peanut shaped, round, ovular, oblong, polygonal, or any other shape as desired.

As illustrated, the block fittings 2, 4 are illustrated as a block fitting separate from a component or system. However, according to an alternate embodiment, the block fittings 2, 4 can each be configured as a component such as a component block integrated with a system or integrated with a system structure. For example, the component can be a refrigerant system component such as a condenser block or compressor manifold. In other examples, the component can be a housing or other similar structure of a system. According to the alternate embodiment, the male block fitting 2 is a block fitting configured for coupling to the female block component configured as a female block component of a system or a system structure. Similarly, the male block component is a male block component of a system or a system structure is configured for coupling to the female block fitting 4 configured as a block fitting.

Figure 2:
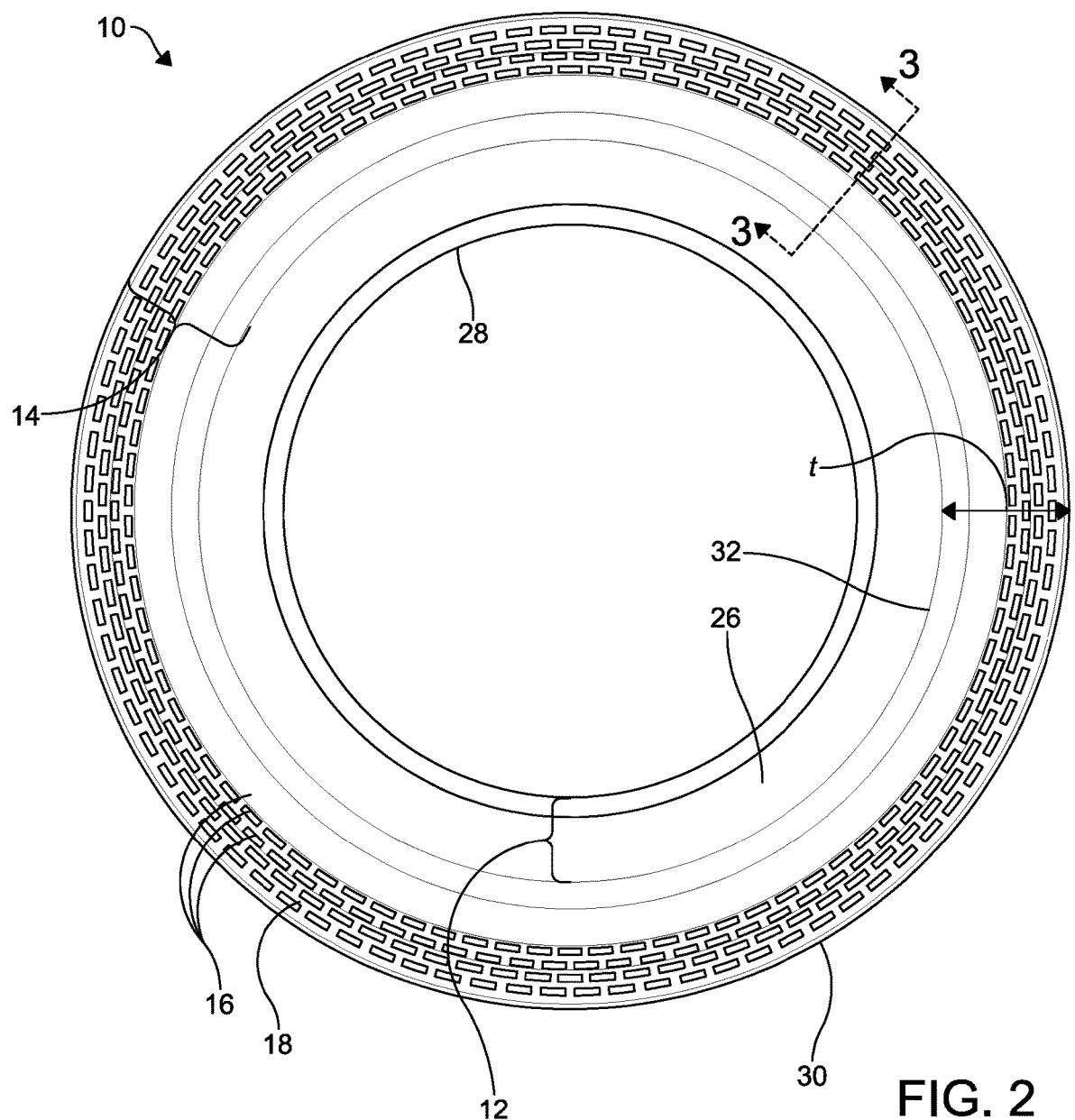
FIG. 2 is a left side elevational view of a seal assembly according of the block fitting assembly of FIG. 1.
Figure 3:
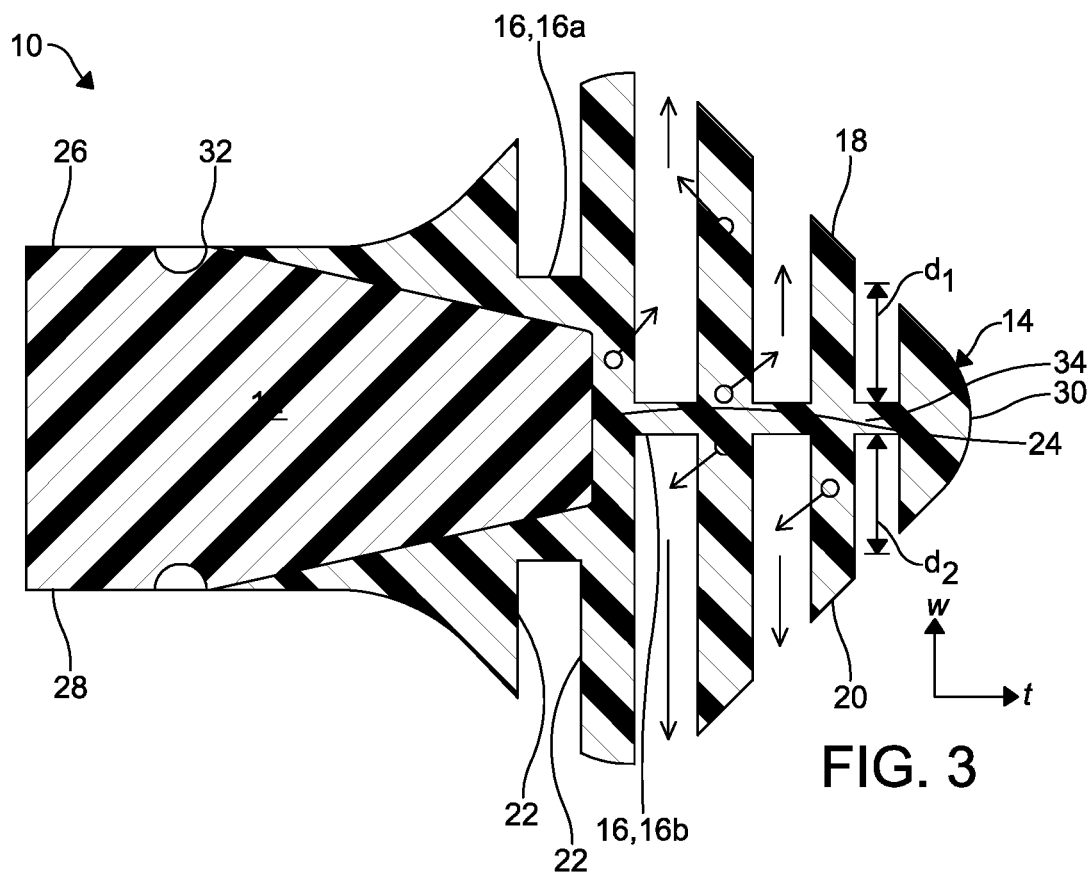
FIG. 3 is a fragmentary cross-sectional view of the seal assembly of FIG. 2 taken through the line 3-3, wherein recesses formed in the seal assembly are in an open configuration.
Figure 4:
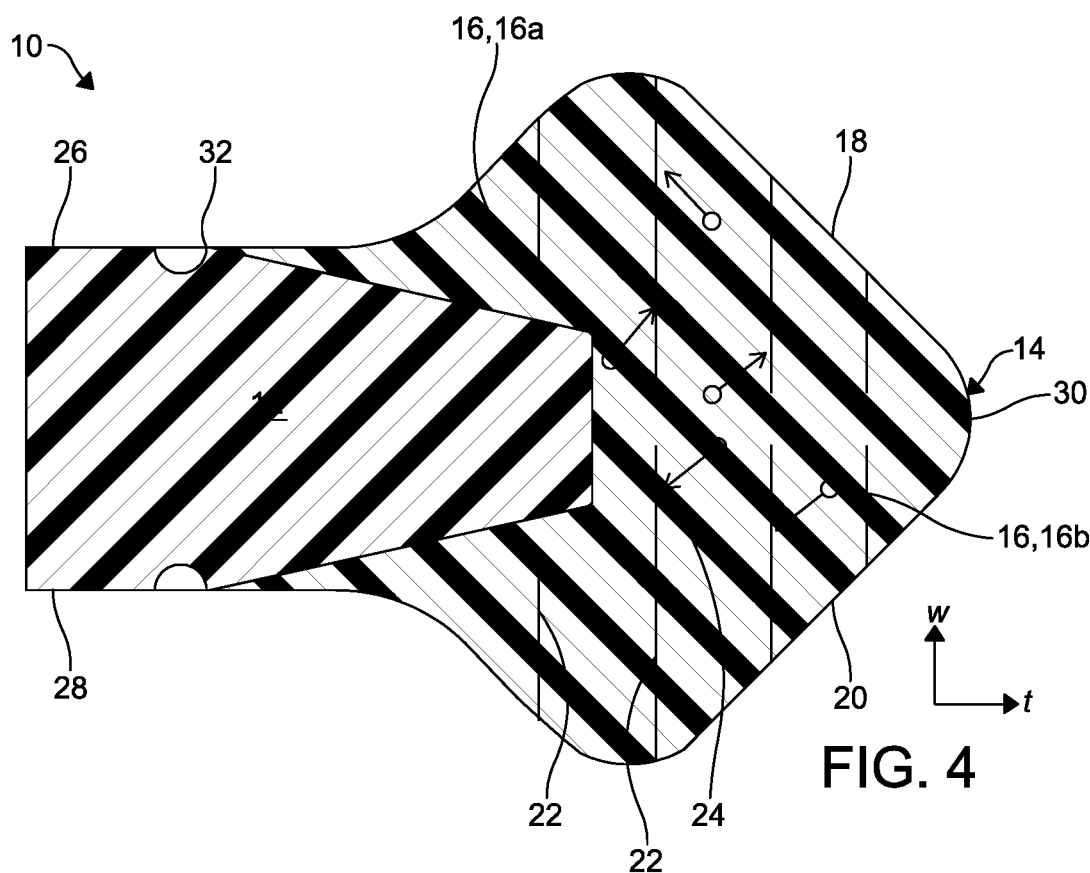
FIG. 4 is a fragmentary cross-sectional view of the seal assembly of FIG. 2 taken through the line 3-3, wherein recesses formed in the seal assembly are in a closed configuration.

FIGS. 2-4 illustrate the seal assembly 10 of the block fitting assembly 1. The seal assembly 10 includes an annular inner seal member 12 and an annular outer seal member 14 coupled to the inner seal member 12. The inner seal member 12 is formed from a metal material. However, the inner seal member 12 may be formed from other materials, if desired. The outer seal member 14 is formed from an elastomeric material. For example, the elastomeric material can be ethylene propylene diene monomer (EDPM) rubber, FKM fluoropolymer, VITON® fluoroelastomer manufactured by the Chemours Company, nitrile rubber such as hydrogenated nitrile butadiene rubber (HNBR), or any other similar type of elastomer, as desired. However, it is understood the seal outer seal member 14 may be formed from other materials having desired characteristics such as deformability and chemical resistance. For example, the outer seal member 14 can be formed from nylon or plastic for example. In the embodiment illustrated, the outer seal member 14 is coupled to the inner seal member 12 by an over mold, wherein a portion of the outer seal member 14 overlays outer portion of the inner seal member 12. For example, as shown, the outer seal member 14 is formed about an outer circumferential edge surface 24, an outer radial portion of a first surface 26, and an outer radial portion of a second surface 28 opposite the first surface 26 of the inner seal member 12. As a result, the inner seal member 12 impregnates the outer seal member 14 to form the assembled seal assembly 10.

In the embodiment illustrated, a portion of the first surface 26 and the second surface 28 adjacent the edge surface 24 of the inner seal member 12 taper outwardly towards the edge surface 24 to cause the inner seal member 12 to gradually decrease in thickness towards the edge surface 24. However, it is understood, the first surface 26 and the second surface 28 of the inner seal member 12 can be continuously planar, wherein the inner seal member 12 does not taper outwardly towards the edge surface 24.

The outer seal member 14 includes a plurality of recesses 16 formed in a first surface 18 and an opposing second surface 20 thereof. The recesses 16 are configured as a plurality of slots with an arcuate oblong cross-sectional shape. The recesses 16 formed in the first surface 18 will be herein designated as first recesses 16a and the recesses 16 formed in the second surface 20 will be herein designated as second recesses 16b. As shown, the recesses 16 are formed in a portion of the outer seal member 14 adjacent an outer end 30 of the outer seal member 14. However, the recesses 16 can be formed along an entire thickness t of the outer seal member 14 from an inner end 32 to the outer end 30 of the outer seal member 14.

Each of the first recesses 16a extends into the first surface 18 at a first depth $d_1$ and each of the second recesses 16b extend into the second surface 20 at a second depth $d_2$. As shown, the first depth $d_1$ of each of the first recesses 16a varies along the thickness t of the outer seal member 14 and the second depth $d_2$ of each of the second recesses 16b varies along the thickness t of the outer seal member 14. However, in alternate embodiments, it is understood the first depth $d_1$ of each of the first recesses 16a and the second depth $d_2$ of each of the second recesses 16b can be substantially equal. In yet another embodiment, the first depth $d_1$ of at least two, but not an entirety, of the first recesses 16a can be substantially equal and the second depth $d_2$ of at least two, but not an entirety, of the second recesses 16b can be substantially equal. A boundary 34 of material of the outer seal member 14 separates the first recesses 16a from the second recesses 16b. The boundary 34 is formed at a substantially centralized portion of the width w of the outer seal member 14, wherein the boundary 34 is spaced equally at a perpendicular distance from the first surface 18 of the outer seal member and a perpendicular distance from the second surface 20 along the thickness t of the outer seal member 14. However, it is understood, in other embodiments, the boundary 34 can be formed at an off-center portion of the width w of the outer seal member 14, wherein the boundary 34 is unequally spaced at the perpendicular distance from the first surface 18 of the outer seal member and the perpendicular distance from the second surface 20 along the thickness t of the outer seal member 14.

As shown, the first surface 18 and the second surface 20 of the outer seal member 14 each has a varying non-planar contour, wherein the contour of each of the surfaces 18, 20 are curvilinear. According to another embodiment, the first surface 18 and the second surface 20 of the outer seal member 14 can have substantially planar contours. The depths of each of the first recesses 16a and the second recesses 16b may depend on the contour of the first surface 18 and the second surface 20.

As shown, the recesses 16 are formed in portions of the outer seal member 14 overlapping the inner seal member 12 and in portions of the outer seal member 14 not overlapping the inner seal member 12. However, in other embodiments, the recesses 16 can be formed entirely in the portions of the outer seal member 14 not overlapping the inner seal member 12 or in an entirety of the outer seal member 14.

The first recesses 16a formed in the first surface 18 of the outer seal member 14 align with the second recesses 16b formed in the second surface 20 of the outer seal member 14 to minimize a thickness of the outer seal member 14 where the recesses 16 are formed. However, if desired, the first recesses 16a formed in the first surface 18 of the outer seal member 14 can be misaligned with the second recesses 16b formed in the second surface 20 of the outer seal member 14.

The recesses 16 are formed in a plurality of concentrically formed annular rows. In the embodiment illustrated, four rows of the recesses 16 are formed. However, it is understood the outer seal member 14 can include more than or fewer than four rows of the recesses 16. The rows of the recesses 16 are formed in a staggered pattern on each of the surfaces 18, 20 of the outer seal member 14. For example, the recesses 16 can be formed in a plurality of annularly aligned rows on each surface 18, 20, wherein the recesses 16 of one of the rows is offset from an adjacent one of the rows and the recesses 16 of alternating ones of the rows are aligned. However, it is understood, none of the rows of the recesses 16 can align with each other, all of the rows of the recesses 16 can align with each other, or the recesses 16 can be formed in a substantially random pattern, if desired. While the recesses 16 illustrated extend continuously in an annular manner, it is understood the recesses 16 can extend in one or more intermittent arc segments.

As shown in FIG. 3, the outer seal member 14 is shown in an "as molded" or "free state" configuration meaning the outer seal member 14 is not in a compressed state or configuration. In the free state configuration, the outer seal member 14 is expanded, wherein opposing sidewalls 22 defining the recesses 16 are separated, biased outwardly from, or spaced from each other to define the recesses 16 in an open configuration. During compression of the air conditioning system, the outer seal member 14 contracts, compresses, or squeezes to cause the sidewalls 22 of each of the recesses 16 to bias inwardly towards each other with respect to a radial direction of the outer seal member 14, as shown in FIG. 4. As the outer seal member 14 compresses, the sidewalls 22 of the recesses 16 may engage each other. The compression of the outer seal member 14 causes the sidewalls 22 of the recesses 16 to transition towards a closed configuration, wherein sidewalls 22 defining each of the recesses 16 substantially engage each or are in close proximity to each other to almost engage each other to significantly minimize a passage of gases or fluids through the recesses 16. During compression, the seal assembly 10 maintains sealing integrity because the recesses 16 are in the closed configuration, wherein a desired outer sealing width is maintained.

As shown in FIG. 3, during decompression, the sidewalls 22 of the recesses 16 return to substantially the same position as in the free state position, wherein the sidewalls 22 are spaced from each other with respect to a radial direction of the outer seal member 14 in the open configuration. As a result, the width w of the outer seal member 14 at the recesses 16 is less than the outer sealing thickness of the outer seal member 14.

Gases, such as $CO_2$ gases from the R744 refrigerant flowing through the air conditioning system, for example, are embedded by sorption within the outer seal member 14 during compression. While R744 refrigerant is used as an example of a fluid producing $CO_2$ gases, it is understood other fluids may produce gases that may become embedded in the outer seal member 14 requiring release. Sorption is a chemical and physical process in which one substance becomes attached to another substance by absorption and adsorption in a single process. However, during decompression, the gases must escape the outer seal member 14 rapidly. The recesses 16 control and minimize a distance the gases must travel. Due to the recesses 16, the gases travel a shorter distance to be released from the outer seal member 14 than in seal members without recesses. The recesses 16 provide a quicker escape path for the gases. It is understood, depending on the nature of the compression, an entirety or only a portion of the sidewalls 22 of the recesses 16 may transition to the closed configuration. FIGS. 3-4 schematically illustrate minimized paths (represented by the arrows) the gases (represented by "o") take to be released from the outer seal member 14.

According to alternate embodiments, the recesses 16 formed in the outer seal member 14 can have varying shapes and configurations, as desired. Examples of alternate recesses will be shown and described herein below.

Figure 5:
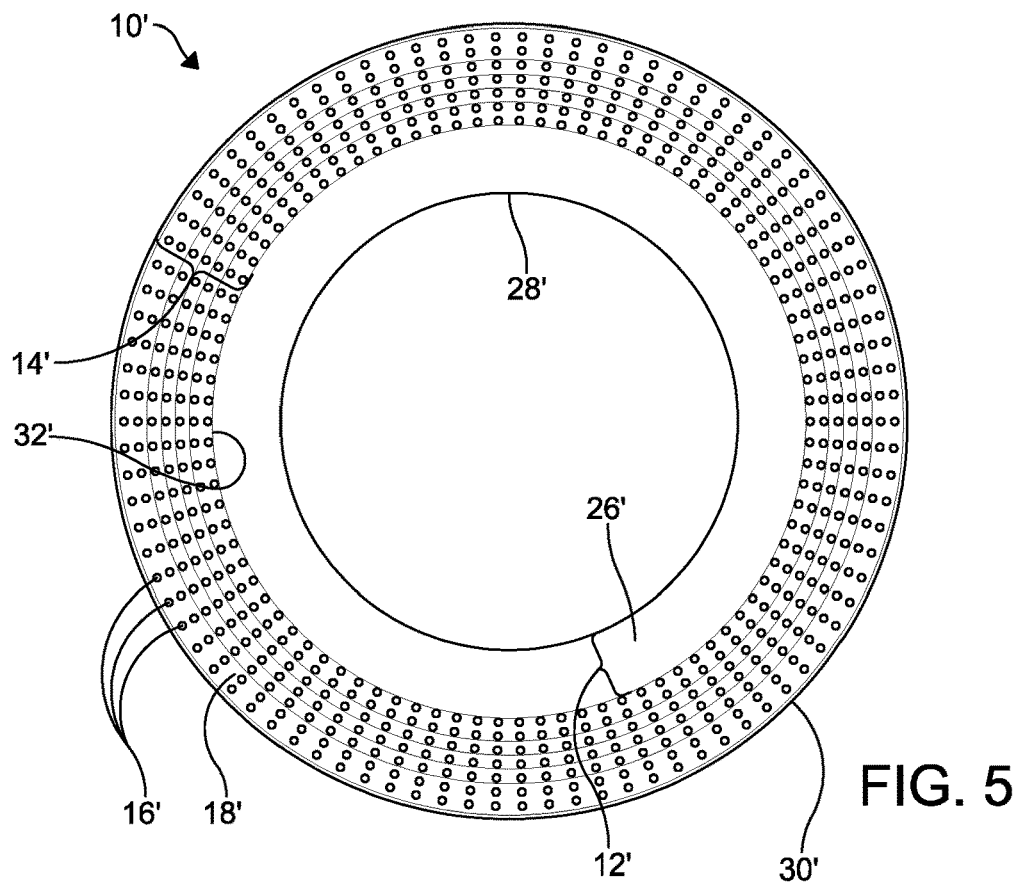
FIG. 5 is a left side elevational view of a seal assembly according to another embodiment of the disclosure.

As shown in FIG. 5, a seal assembly 10' according to an alternate embodiment is illustrated. Features of the seal assembly 10' of FIG. 5 the same as or similar to the features of the seal assembly 10 of FIGS. 1-4 are indicated by the same reference numeral but with a prime (') symbol for convenience. The seal assembly 10' is substantially the same as the seal assembly 10' of FIGS. 1-4, except each of the recesses 16' are cylindrical and have a circular cross-sectional shape and are formed into seven annular aligning rows with respect to a radial direction of the outer seal member 14'. It is understood, the recesses 16' can have other cross-sectional shapes as desired. For example. The cross-sectional shapes of the recesses 16' can be elliptical, ovular, triangular, rectangular, polygonal, serpentine, oblong, zigzag, or any other shape, as desired. Additionally, as mentioned herein above, the recesses 16' can form any number of rows as desired, aligned or non-aligned. In the embodiment illustrated in FIG. 5, the recesses 16' formed in the first surface 18' can be aligned or non-aligned with the recesses (not shown) formed in the second surface 20'. The arrangement of the recesses 16' formed in the first surface 18' with respect to the arrangement of the recesses 16' formed in the second surface 20' would be the same or similar to the arrangement of the recesses 16 described and shown with respect to FIGS. 1-4.

According to FIG. 5, opposing portions of the sidewalls 22' of each of the recesses 16' transition towards and away from each other, from the closed configuration and the open configuration, with respect to a radial direction of the outer seal member 14' during compression and decompression states of the refrigerant system. As a result of the recesses 16', gases can be released from the outer seal member 14' in a rapid manner.

Figure 6:
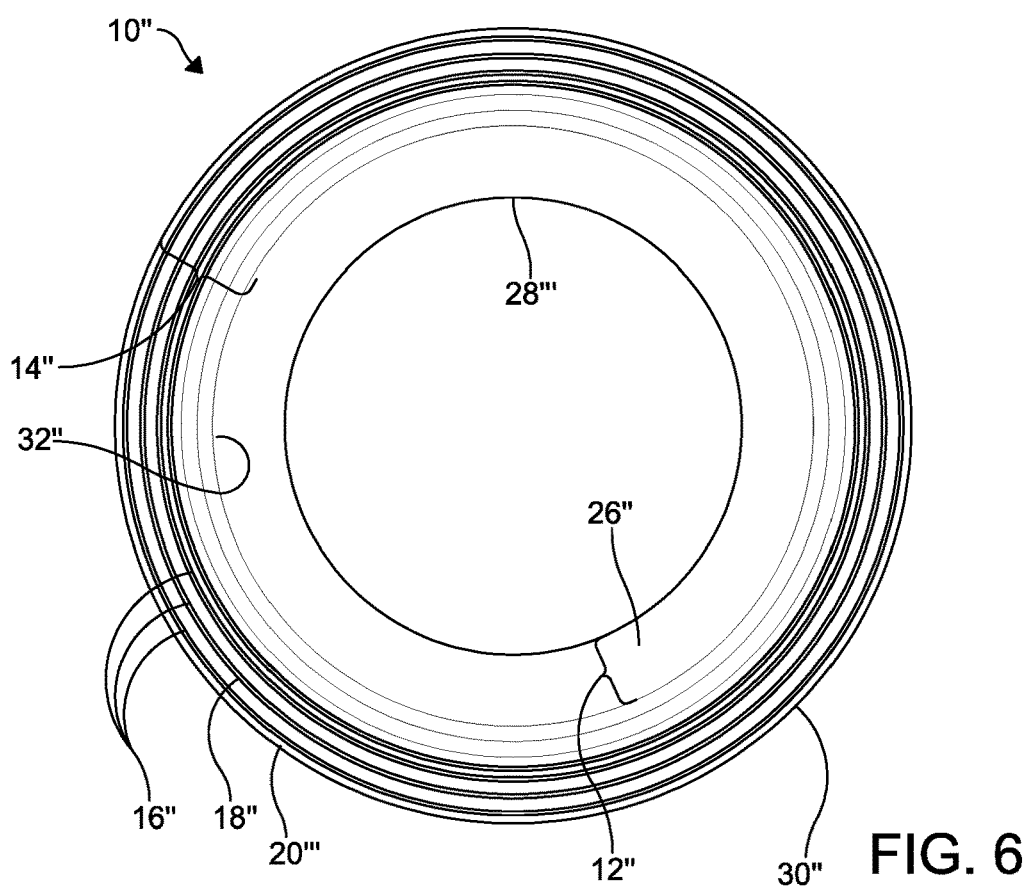
FIG. 6 is a left side elevational view of a seal assembly according to another embodiment of the disclosure.

As shown in FIG. 6, a seal assembly 10" according to another alternate embodiment is illustrated. Features of the seal assembly 10" of FIG. 6 the same as or similar to the features of the seal assembly 10, 10' of FIGS. 1-5 are indicated by the same reference numeral but with a double prime (") symbol for convenience. The seal assembly 10" is substantially the same as the seal assembly 10, 10' of FIGS. 1-5, except each of the recesses 16" are continuously annularly formed rings in both the first surface 18" and the second surface of the outer seal member 14". The recesses 16" are concentric with each other. In the embodiment illustrated, four rows of the recesses 16" are illustrated. However, as mentioned herein above, the recesses 16" can be formed in any number of rows as desired. The recesses 16" formed in the first surface 18" can be aligned or non-aligned with the recesses (not shown) formed in the second surface 20". The arrangement and depth of the recesses 16" formed in the first surface 18" with respect to the arrangement of the recesses 16" formed in the second surface 20" would be the same or similar to the arrangement of the recesses 16, 16' described and shown with respect to FIGS. 1-5.

According to FIG. 6, the sidewalls 22" of each of the recesses 16" transition towards and away from each other, from the closed configuration and the open configuration, with respect to a radial direction of the outer seal member 14" during compression and decompression states of the refrigerant system. As a result of the recesses 16", gases can be released from the outer seal member 14" in a rapid manner.

Figure 7:
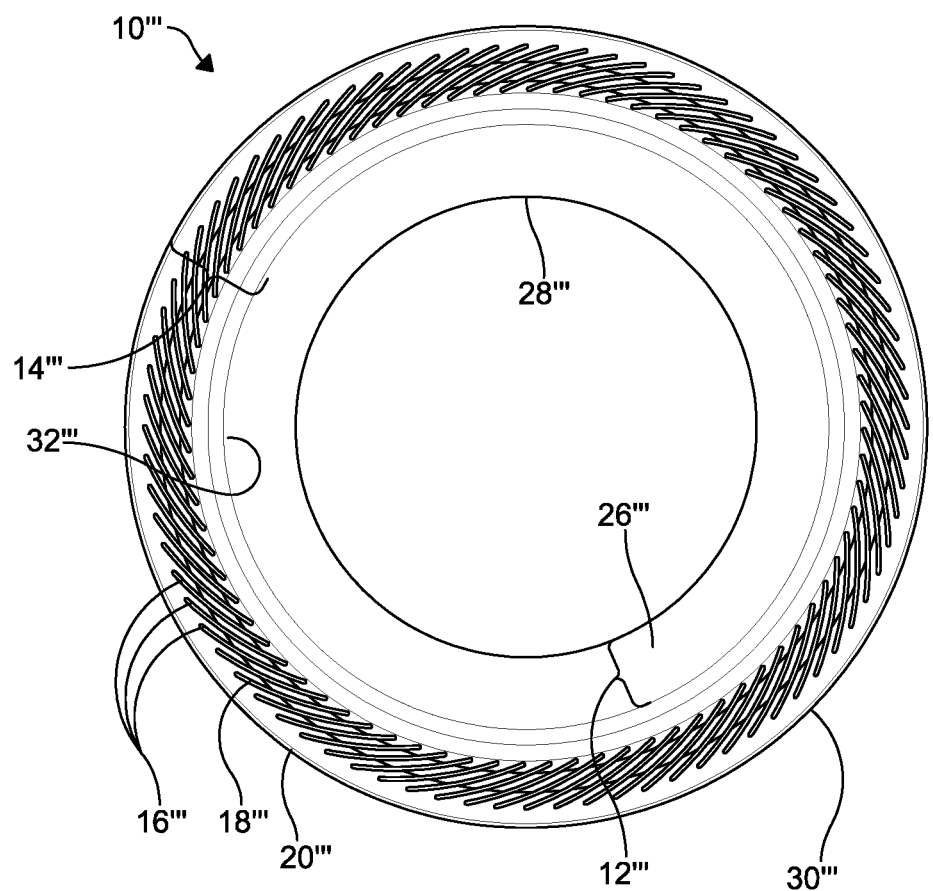
FIG. 7 is a left side elevational view of a seal assembly according to another embodiment of the disclosure.

As shown in FIG. 7, a seal assembly 10''' according to an alternate embodiment is illustrated. Features of the seal assembly 10''' of FIG. 6 the same as or similar to the features of the seal assembly 10, 10', 10" of FIGS. 1-6 are indicated by the same reference numeral but with a triple prime (''') symbol for convenience. The seal assembly 10''' is substantially the same as the seal assembly 10, 10', 10" of FIGS. 1-6, except each of the recesses 16''' are annularly aligned slanted slots, wherein the recesses 16''' are angled with respect to a line extending perpendicularly between the outer end 30''' and the inner end 32''' of the outer seal member 14'''. In the embodiment illustrated, the recesses 16''' are formed in each of the surfaces 18''', 20''' of the outer seal member 14''' in a singular annular row. However, as mentioned herein above, the recesses 16''' can be formed in any number of rows as desired. The recesses 16''' formed in the first surface 18''' can be aligned or non-aligned with the recesses (not shown) formed in the second surface 20'''. For example, the recesses 16''' formed in the first surface 18''' can be angled in an equal and a same slope, an equal and an opposite slope, or an unequal and an opposite slope as the recesses 16''' formed in the second surface 20''', as desired. The arrangement and depth of the recesses 16''' formed in the first surface 18''' with respect to the arrangement of the recesses 16''' formed in the second surface 20''' would be the same or similar to the arrangement of the recesses 16, 16', 16" described and shown with respect to FIGS. 1-6.

According to FIG. 7, the sidewalls 22''' of each of the recesses 16''' transition towards and away from each other, from the closed configuration and the open configuration, with respect to a radial direction of the outer seal member 14''' during compression and decompression states of the refrigerant system. As a result of the recesses 16''', gases can be released from the outer seal member 14''' in a rapid manner.

While certain representative embodiments and details have been shown for purposes of illustrating the invention, it will be apparent to those skilled in the art that various changes may be made without departing from the scope of the disclosure, which is further described in the following appended claims.

What is claimed is:

1. A block fitting assembly comprising:
   a block fitting configured as one of a female block fitting and a male block fitting, the block fitting receiving a tube conveying a refrigerant; and
   a seal assembly engaging the block fitting, the seal assembly including an annular elastomeric seal member having a plurality of recesses formed therein, the elastomeric seal having gases from the refrigerant embedded therein from a sorption process, the elastomeric seal releasing the gases through the plurality of recesses.

2. The block fitting assembly of claim 1, wherein the plurality of recesses transitions between a substantially closed configuration when the seal member is compressed and an open configuration when the seal member is decompressed, and wherein the gases are released when the plurality of recesses is in the substantially open configuration.

3. A seal assembly for an air conditioning system comprising:
   an annular inner seal member; and
   an annular outer seal member coupled to the inner seal member, the outer seal member having a first recess formed in a first surface thereof, the first recess transitioning between a substantially closed configuration when the outer seal member is compressed and a substantially open configuration when the outer seal member is decompressed, wherein a gas is embedded in the outer seal member by sorption and released from the outer seal member through the first recess in the open configuration.

4. The seal assembly of claim 3, wherein a second recess is formed in a second surface of the outer seal member.

5. The seal assembly of claim 4, wherein the second recess is aligned with the first recess.

6. The seal assembly of claim 3, wherein the first recess is one of an oblong slot, a cylindrical recess, and a continuous annular slot.

7. The seal assembly of claim 3, wherein the inner seal member is formed from a metal and the outer seal member is formed from an elastomeric material, and wherein the outer seal member is coupled to the inner seal member by an over mold.

8. A seal assembly for an air conditioning system comprising:
   an annular inner seal member; and
   an annular outer seal member coupled to the inner seal member, the outer seal member having a plurality of first recesses formed in a first surface thereof and a plurality of second recesses formed in a second surface thereof, each of the plurality of first recesses and the plurality of second recesses transitioning between a closed configuration when the outer seal member is compressed and an open configuration when the outer seal member is decompressed.

9. The seal assembly of claim 8, wherein the inner seal member is a metal and the outer seal member is an elastomeric material, and wherein the outer seal member is over molded to the inner seal member.

10. The seal assembly of claim 8, wherein the plurality of first recesses align with the plurality of second recesses.

11. The seal assembly of claim 8, wherein the plurality of first recesses is a plurality of annularly arranged slots with an arcuate oblong cross-section.

12. The seal assembly of claim 8, wherein the plurality of first recesses is a plurality of cylindrical recesses.

13. The seal assembly of claim 8, wherein the plurality of first recesses is a plurality of annular recesses.

14. The seal assembly of claim 8, wherein the plurality of first recesses is a plurality of annularly aligned slanted slots.

15. The seal assembly of claim 8, wherein the plurality of first recesses and the plurality of second recesses are arranged in a plurality of rows.

16. The seal assembly of claim 15, wherein the plurality of rows is aligned with respect to a thickness of the outer seal member.

17. The seal assembly of claim 15, wherein adjacent ones of the plurality of rows are offset from each other with respect to a thickness of the outer seal member.

18. The seal assembly of claim 8, wherein each of the plurality of first recesses extends into the first surface at a first depth and each of the plurality of second recesses extends into the second surface at a second depth, and wherein the first depth of the plurality of first recesses varies along a thickness of the outer seal member and the second depth of the plurality of second recesses varies along a thickness of the outer seal member.

19. The seal assembly of claim 8, wherein each of the first surface and the second surface of the outer seal member has a curvilinear contour.

* * * * *